(12) United States Patent
Schumacher et al.

(10) Patent No.: US 6,190,423 B1
(45) Date of Patent: Feb. 20, 2001

(54) DYE MIXTURES OF FIBER-REACTIVE AZO DYES AND USE THEREOF FOR DYEING MATERIAL CONTAINING HYDROXY-AND/ OR CARBOXAMIDO GROUPS

(75) Inventors: Christian Schumacher, Kelkheim; Uwe Reiher; Joachim Steckelberg, both of Hofheim; Werner Russ, Flörsheim-Wicker; Ronald Pedemonte, Eppstein-Vockenhausen, all of (DE)

(73) Assignee: DyStar Textilfarben GmbH & Co (DE)

( * ) Notice: Under 35 U.S.C. 154(b), the term of this patent shall be extended for 0 days.

(21) Appl. No.: 09/456,959

(22) Filed: Dec. 7, 1999

(51) Int. Cl.⁷ .............................. C09B 67/24; D06P 1/382; D06P 1/384
(52) U.S. Cl. ........................................ 8/549; 8/641; 8/692
(58) Field of Search ................................ 8/549, 641, 692

(56) References Cited

FOREIGN PATENT DOCUMENTS

1215282 * 4/1966 (DE).

\* cited by examiner

Primary Examiner—Margaret Einsmann

(74) Attorney, Agent, or Firm—Connolly Bove Lodge & Hutz LLP

(57) ABSTRACT

The present invention comprises a dye mixture comprising one or more, such as one, two or three, disazo dyes conforming to the general formula (1), one or more, such as one, two or three, dyes.

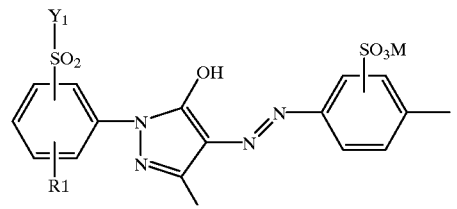

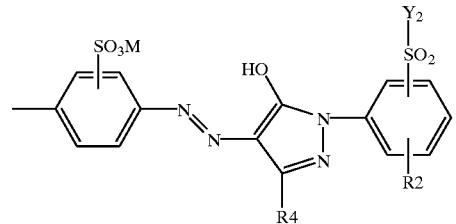

(1)

9 Claims, No Drawings

DYE MIXTURES OF FIBER-REACTIVE AZO DYES AND USE THEREOF FOR DYEING MATERIAL CONTAINING HYDROXY-AND/ OR CARBOXAMIDO GROUPS

DESCRIPTION

The present invention relates to the field of fiber-reactive dyes. It describes yellow to orange mixtures of fiber-reactive monoazo dyestuffs and use thereof for dyeing hydroxy- and/or carboxamido-containing fiber material.

The dyes according to the general formulae (1) are known from the German Patent DE-C 1215282. Dyes according to the general formulae (2) are known from the German Patents DE-C 1911427, DE-C 1644240 and the U.S. patents U.S. Pat. No. 4,725,675, U.S. Pat. No. 4,703,112.

The mixtures composed from dyes of formula (1) and formula (2) are new and provide advantages, such as color build-up and solubility in an aqueous dyebath in the presence of alkali and electrolyte salts over the individual dyes represented by formula (1) or formula (2).

The present invention concerns dye mixtures of fiber-reactive azo dyes, suitable for dyeing hydroxy- and/or carboxamido-containing material in yellow to orange shades, which comprise one or more disazo dyestuffs corresponding to the general formula (1) and one or more monoazo dyestuff corresponding to the formula (2)

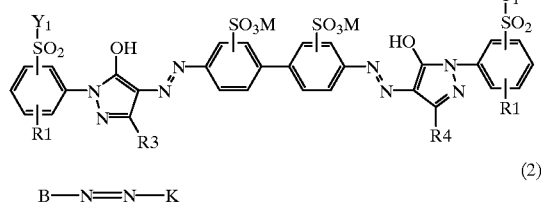
(1)

B—N≡N—K (2)

in which $R_1$ is hydrogen, sulfo, $C_1$–$C_4$ alkyl or alkoxy or halogen and preferably hydrogen $R_2$ has one of the meanings of $R_1$;

$R_3$ is $C_1$–$C_4$-alkyl, phenyl, carboxy or $C_1$–$C_4$-carboxyalkyl, preferably carboxy, carboxymethyl and in particular preferably methyl $R_4$ has one of the meanings of $R_3$;

$Y_1$ is vinyl or is ethyl which is substituted in the β-position by a substituent which is eliminated by the action of an alkali, forming the vinyl group, $Y_2$ has one of the meanings of $Y_1$;

B is a radical of the formulae (3) or (4) or (5); if B is (5) then K is preferably (10) or is preferably (11) provided that D is a structure of the formula (3);

M is hydrogen or an alkali metal, such as lithium, sodium and potassium;

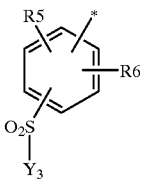
(3)

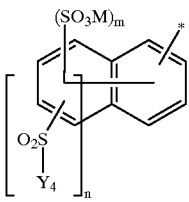
(4)

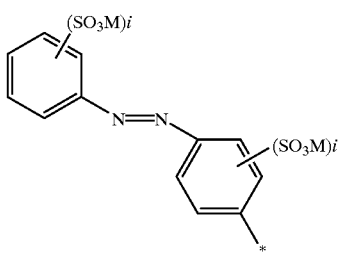
(5)

in which, $R_5$ has one of the meanings of $R_1$;

$R_6$ has one of the meanings of $R_1$;

$Y_3$ has one of the meanings of $Y_1$;

$Y_4$ has one of the meanings of $Y_1$;

m is a number 0, 1, or 2;

i is a number 0 or 1;

n is a number 0 or 1; whereby, n is 0 only when coupled to the coupling formulae (10) or (11) with the proviso that if n is 0 then D in formula (11) is a structure of the formula 3;

M is hydrogen or an alkali metal, such as lithium, sodium and potassium;

K is a coupling component represented by formulae (6), (7), (8), (9), (10) or (11);

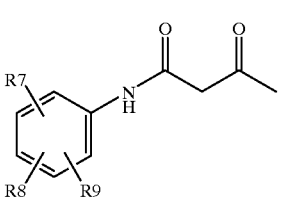
(6)

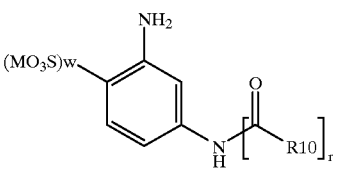
(7)

-continued

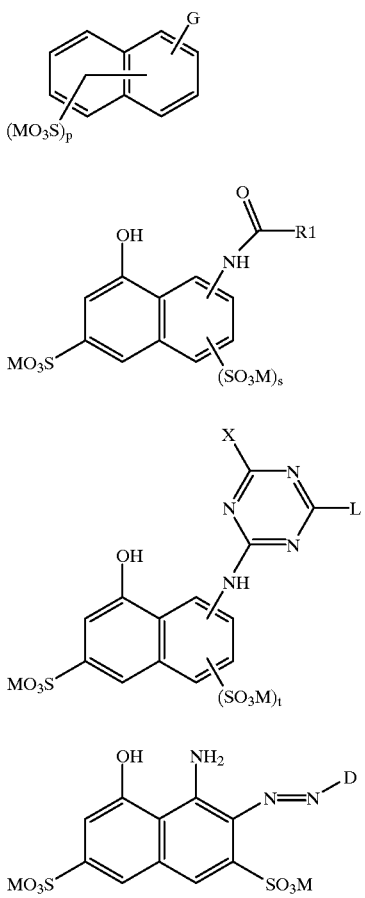

(8)

(9)

(10)

(11)

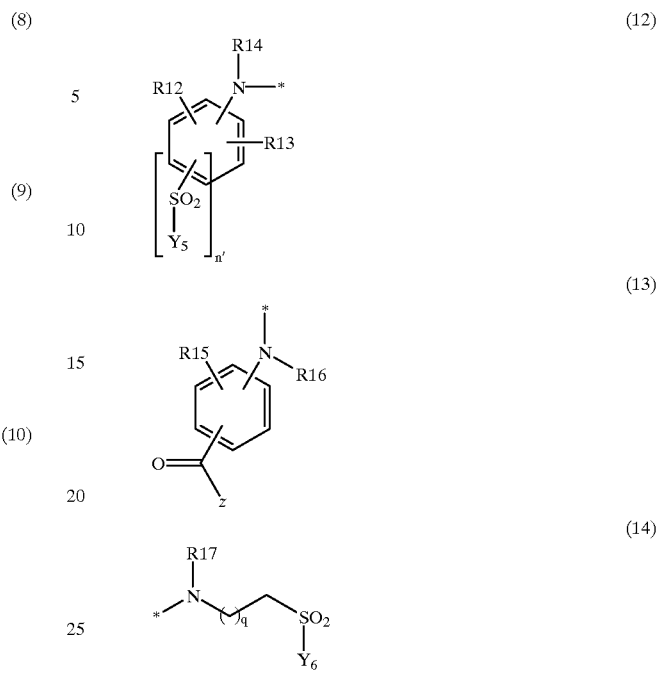

(12)

(13)

(14)

in which

R<sub>7</sub> has one of the meanings of $R_1$;

R<sub>8</sub> has one of the meanings of $R_1$;

R<sub>9</sub> has one of the meanings of $R_1$;

$R_{10}$ is amino, substituted or unsubstituted $C_{1-C4}$ alkyl, in which the preferred substituent is carboxy, or substituted or unsubstituted phenyl, in which the preferred substituent is carboxy or sulfo;

$R_{11}$ is substituted or unsubstituted $C_1$–$C_6$ alkyl, in which the preferred substituent is carboxy, or is substituted or unsubstituted phenyl, in which the preferred substituent is carboxy or sulfo;

D is the radical (3), (4), or (5);

G is amino or hydroxy;

X is hydroxy, chloro, fluoro, morpholino, nicotinamido, 3-carboxypyridino, or a radical of the formulae L;

r,s,t,w is the number 0 or 1;

p is the number 1 or 2; and

L has one of the meanings of formulae (12), (13), or (14);

M is hydrogen or an alkali metal, such as lithium, sodium and potassium;

in which $R_{12}$ is hydrogen, $C_{1-C4}$ alkyl or alkoxy, halogen or sulfo;

$R_{13}$ is hydrogen or $C_{1-C4}$ alkyl or alkoxy; halogen or sulfo;

$R_{14}$ is hydrogen, $C_1$–$C_6$ alkyl, or substituted or unsubstituted phenyl, in which the preferred substituents are $C_{1-C4}$ alkyl or alkoxy, or sulfo;

$R_{15}$ is hydrogen or sulfo;

$R_{16}$ is hydrogen, $C_1$–$C_6$ alkyl, or substituted or unsubstituted phenyl, in which the preferred substituents are $C_{1-C4}$ alkyl or alkoxy, or sulfo;

$R_{17}$ is hydrogen, $C_1$–$C_6$ alkyl, or substituted or unsubstituted phenyl, in which the preferred substituents are $C_{1-C4}$ alkyl or alkoxy, or sulfo;

$Y_5$ has one of the meanings of $Y_1$ $Y_6$ has one of the meanings of $Y_1$;

n' is the number 0 or 1.

q represents $C_1$–$C_5$-alkylene groups, which may be interrupted by a nitrogen, oxygen, or sulfur atom; and Z is a radical of the formulae (12) or (14).

Radicals of the formulae (3)

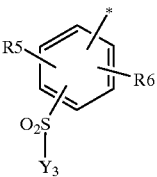

(3)

of the azo dyestuffs of the formulae (2) are, for example, 3-(β-sulfatoethylsulfonyl)-, 4-(β-sulfatoethylsulfonyl)-, 2-methyl-5-(β-sulfatoethylsulfonyl)-, 2-methoxy-5-(β-sulfatoethylsulfonyl)-, 4-methyl-3-(β-sulfatoethylsulfonyl)-, 2,5-dimethyl-(β-sulfatoethylsulfonyl)-, 2,6-dimethyl-4-(β-sulfatoethylsulfonyl)-, 2-methoxy-4-(β-sulfatoethylsulfonyl)-, 4-methoxy-5-(β-sulfatoethylsulfonyl)-, 2,4-dimethoxy-5-(β-sulfatoethylsulfonyl)-, or 2,5-dimethoxy-4-(β-sulfatoethylsulfonyl)-, 2-sulfo-4(β-sulfatoethylsulfonyl-).

Radicals of the formulae (4)

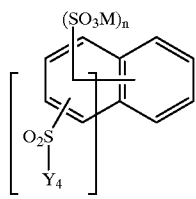

(4)

of the azo dyestuffs of the formulae (2) are, for example, 2-Amino6-(β-sulfatoethylsulfonyl)-1-sulfo-naphthyl-2- and 2-Amino-8-(β-sulfatoethylsulfonyl)-6-sulfonaphthyl-.

Radicals of the formulae (5)

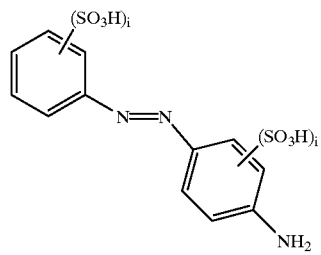

(5)

of the azo dyestuffs of the formulae (2) are, for example, 2-amino-5-[(4'-sulfophenyl)azo]benzenesulfonic acid, 4-amino-4-[(4'-sulfophenyl)azo]benzene, and 2-amino-5-[(4'-Sulfo-phenyl)azo]benzene.

Coupling components of the formulae (6)

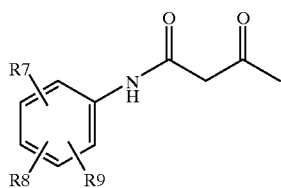

(6)

for the preparation of the azo dyestuffs of the formula (2) are, for example, 2'-Methoxy-5'-methyl-4'-sulfoacetoacetanilide, 2',5'-Dimethoxy-4'-sulfoacetoacetanilide, 2',5'-Dimethyl-4'-sulfoacetoacetanilide, or 2'-Methoxy-4'-sulfoacetoacetanilide.

Coupling components of the formulae (7)

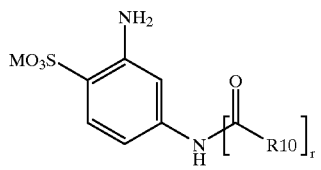

(7)

for the preparation of the azo dyestuffs of the formula (2) are, for example, 2,4-Diaminobenzeneulfonic acid, 2,5 Diaminobenzenesulfonic acid, 3'-Amino-4'sulfoacetanilide, 3'-Aminophenylurea, or 3'-Amino-4'-sulfophenylurea.

Coupling components of the formulae (8)

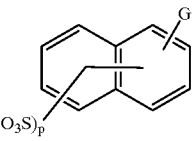

(8)

for the preparation of the azo dyestuffs of the formula (2) are, for example, 1-Aminonaphthalene-4-sulfonic acid, 1-Aminonaphthalene-3-sulfonic acid, 1-Aminonaphthalene-5-sulfonic acid, 1-Aminonaphthalene-6-sulfonic acid, 1-Aminonaphthalene-7-sulfonic acid, 1-Aminonaphthalene-8-sulfonic acid, 2-Aminonaphthalene-4-sulfonic acid, 2-Aminonaphthalene-5-sulfonic acid, 2-Aminonaphthalene-6-sulfonic acid, 1-Hydroxynaphthalene-4-sulfonic acid, 1-Hydroxynaphthalene-3-sulfonic acid, 1-Hydroxynaphthalene-5-sulfonic acid, 1-Hydroxynaphthalene-6-sulfonic acid, 1-Hydroxynaphthalene-7-sulfonic acid, 1-Hydroxynaphthalene-8-sulfonic acid, 2-Hydroxynaphthalene-4-sulfonic acid, 2-Hydroxynaphthalene-5-sulfonic acid, 2-Hydroxynaphthalene-6-sulfonic acid, 2-Hydroxynaphthalene-7-sulfonic acid, or 2-Hydroxynaphthalene-8-sulfonic acid.

Coupling components of the formulae (9)

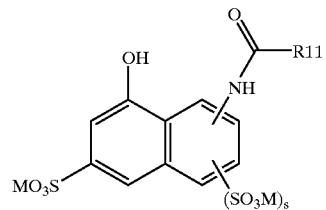

(9)

for the preparation of the azo dyestuffs of the formula (2) are, for example, Acetyl-J-acid, Acetyl-gamma-acid, Acetyl H-acid, or Acetyl K-acid, Benzoyl H-acid, or Benzoyl K-acid.

Representative amino compounds of the formula (13), of the azo dyes of formulae

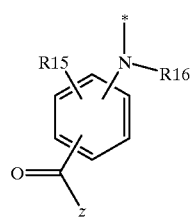

(13)

are for example, 4-Amino-N-(4-((β-sulfatoethyl)sulfonyl)phenyl)benzamid, 4-Amino-N-(3-((β-sulfatoethyl)sulfonyl)phenyl)benzamid, 4-Amino-3-Sulfo-N-(4-((β-sulfatoethyl)sulfonyl)phenyl)benzamid, 4-Amino-3-Sulfo-N-(3-((β-sulfatoethyl)sulfonyl)phenyl)benzamid, or 3-Amino-4-Sulfo-N-(3-((β-sulfatoethyl)sulfonyl)phenyl)benzamid.

Representative amino compounds of the formulae (14), of the coupling components (10)

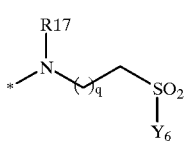
(14)

are for example, N-phenyl-N-[2-(β-sulfatoethylsulfonyl)-ethylamine, 3-(β-Sulfatoethylsulfonyl)-propylamine, N-methyl-3-(β-sulfatoethylsulfonyl)propylamine, N-methyl-2-(β-sulfatoethylsulfonyl)-ethylamine, 2-(β-Sulfatoethylsulfonyl)-ethylamine, 3-(β-Chloroethylsulfonyl)-propylamine, 2-[2'-(β-Sulfatoethylsulfonyl)-ethoxy]-ethylamine, und 2-[2'-(β-Chloroethylsulfonyl)ethoxy]-ethylamine.

Representative bisamino components of the formulae (15)

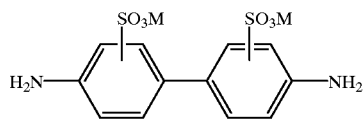
(15)

of the azo dyestuffs of the formula (1) are, for example, 4,4'Diaminodiphenyl-2,2'disulfonic acid and 4,4'-Diaminodiphenyl-3,3'-disulfonic acid.

Representative coupling components of the formula (16) of the azo dyestuffs of

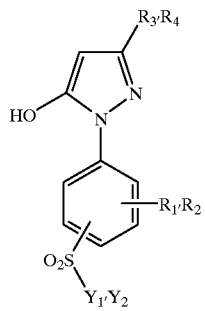
(16)

the formula (1) are, for example, for example 1-(4'-β-Sulfatoethylsulfonyl-phenyl)pyrazolon(5)-3-carboxylic acid, 1-(4'-β-Sulfatoethylsulfonyl-phenyl)-pyrazolon(5)-3-carboxylic acid ethyl ester, 1-(4'-β-Sulfatoethylsulfonyl-phenyl)-pyrazolon(5)-3-methyl, or 1-(3'-β-Sulfatoethylsulfonyl-phenyl)-pyrazolon(5)-3-methyl.

Preferred mixtures contain the disazo dyestuff corresponding to the general formula (1) and one or more dyestuffs corresponding to the general formula 2a, or 2b, or 2c.

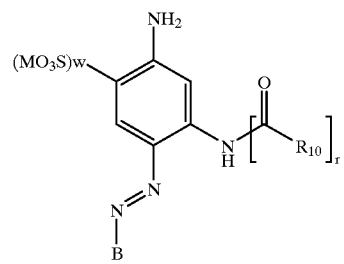
(2a)

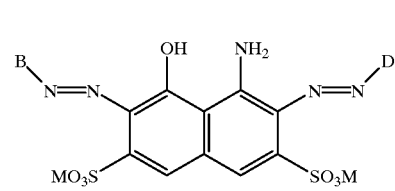
(2b)

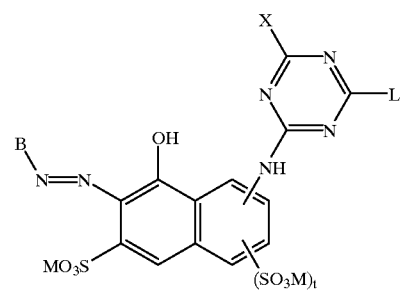
(2c)

Especially preferred mixtures contain the disazo dyestuff corresponding to the general formula (1) and one or more dyestuffs corresponding to the general formula 2A, 2B or 2C.

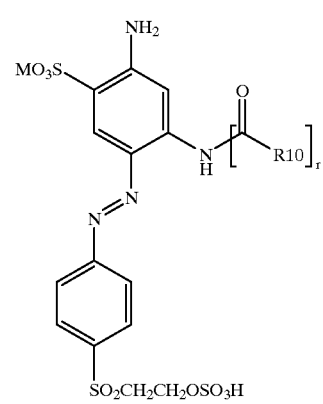
(2A)

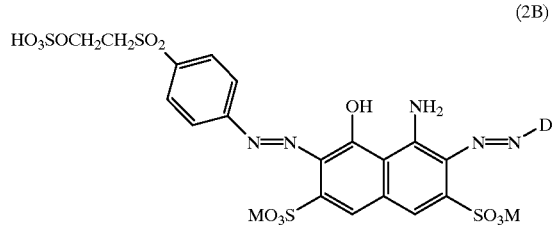
(2B)

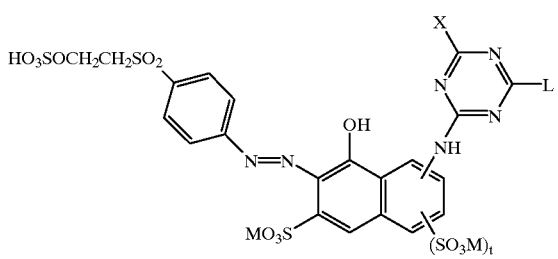

(2C)

The formulae mentioned above and in those below the individual formula members, both with different and with the same designation within a formula, can within the scope of their definition have meanings which are the same as or different from one another.

$C_1$–$C_4$ alkyl substituents are for example methyl, ethyl, n-propyl, i-propyl, n-butyl, i-butyl or tert-butyl; $C_1$–$C_4$ alkoxy substituents are for example methoxy, ethoxy, propoxy, butoxy; $C_1$–$C_4$-carboxyalkyl groups are for example carboxymethyl, carboxyethyl, carboxypropyl and carboxybutyl, $C_1$–$C_4$-alkylene groups are for example methylene, ethylene, n-propylene, i-propylene, n-butylene, i-butylene or tert-butylene. Halogen substituents are for example fluorine, chlorine, bromine and iodine.

A substituent in the β-position of ethyl standing for $Y_1$, $Y_2$, $Y_3$, $Y_4$, $Y_5$ and $Y_6$ is, for example, chlorine, thiosulfato, sulfato, alkanoyloxy of 2 to 5 carbon atoms such as acetyloxy (i.e. R—(C=O)—O—), phosphate, sulfobenzoyloxy (i.e. $HO_3SC_6H_4$—(C=O)—O) or p-toluylsulfonyloxy (i.e. $CH_3C_6H_4SO_2O$—) and $Y_1$, $Y_2$, $Y_3$, $Y_4$, $Y_5$, or $Y_6$ are preferably vinyl, β-chloroethyl, β-thiosulfatoethyl or β-sulfatoethyl and is in particular preferably vinyl or β-sulfatoethyl.

The groups "carboxy", "sulfo", "thiosulfato", "phosphate" and "sulfato" include both the acid form and the salt form of these groups. Accordingly, sulfo groups are groups of the formula —$SO_3M$, thiosulfato groups are groups of the formula —S—$SO_3M$, phosphato groups are groups of the formula —$OPO_3M_2$ and sulfato groups are groups of the formula —$OSO_3M$, in which M is defined as above.

The inventive dye mixture can contain dyes of the same chromophore conforming to the formula (1) and/or dyes of the same chromophore conforming to formula (2) in which the fiber-reactive groups —$SO_2$—$Y_1$, —$SO_2$—$Y_2$, and —$SO_2$—$Y_3$ respectively, are partly vinylsulfonyl groups and partly β-chloroethylsulfonyl or β-thiosulfatoethylsulfonyl or preferably β-sulfatoethylsulfonyl groups. If the inventive dye mixtures contain the respective dye components in the form of a vinylsulfonyl dye, the proportion of the respective vinylsulfonyl dye to the respective 9-chloro- or β-thiosulfato- or β-sulfatoethyl-sulfonyl dye will be up to about 30 mol-%, based on the respective dye chromophore.

Preference is given to inventive dye mixtures in which the proportion of vinylsulfonyl dye to the β-sulfatoethylsulfonyl dye is in terms of the molar ratio between 5:95 and 30:70.

In general, the azo dyestuff or dyestuffs of the formula (1) are contained in the mixture in quantity 80 to 20% by weight and the azo dyestuff or dyestuffs of the formula (2) are contained in the mixture in a mixing ratio of 20 to 80% by weight preferably in a mixing ration of 70% :30% by weight to 30%:70% by weight.

The dye mixtures of the invention can be prepared in solid or in liquid (dissolved) form. In solid form they generally contain the electrolyte salts customary in the case of water-soluble and in particular fiber-reactive dyes, such as sodium chloride, potassium chloride and sodium sulfate, and also assistants customary in commercial dyes, such as buffer substances capable of establishing a pH in aqueous solution between 3 and 7, such as sodium acetate, sodium borate, sodium bicarbonate, sodium citrate, sodium dihydrogenphosphate and disodiumhydrogenphosphate, small amounts of siccatives or if, they are present in liquid, aqueous solution (including the presence of thickeners of the type customary in print pastes), substances which ensure the permanence of these preparations, for example mold preventatives.

In general, the dye mixtures will take the form of dye powders containing from 10 to 80% by weight, based on the dye powder or preparation, of a strength-standardizing colorless diluent electrolyte salt. These dye powders may in addition contain the abovementioned buffer substances in a total amount of up to 5% by weight, based on the dye powder. If the dye mixtures of the invention are present in aqueous solution, the total dye content of these aqueous solutions is up to about 50% by weight, for example between 5 and 50% by weight, the electrolyte salt content of these aqueous solutions preferably being below 10% by weight, based on the aqueous solution; the aqueous solutions (liquid preparations) can in general contain the abovementioned buffer substances in an amount of up to 5% by weight, preferably up to 2% by weight.

The dye mixtures of this invention can be obtained in a conventional manner, for instance by mechanically mixing the individual dyes in solid form or in form of aqueous solutions in the required proportions.

The solution of the dye mixtures according to the invention obtained during synthesis of their individual azo dyes can also be used for dyeing directly as a liquid preparation, if appropriate after addition of a buffer substance and if appropriate also after concentration or dilution.

The dye mixtures according to the invention have valuable properties. They are used for dyeing and printing materials containing hydroxy and/or carboxamide groups, for example in the form of sheet-like structures, such as paper and leather, or of films, such as, for example, of polyamide, or in bulk, such as, for example, polyamide and polyurethane, but in particular these materials in fiber form.

The present invention thus also relates to the use of the dye mixtures according to the invention for dyeing these materials and to processes for dyeing such materials by procedures which are customary per se in which a dye mixture according to the invention is employed as the coloring agent. So, the dye mixtures according to the invention are applied to and fixed on the substrates mentioned, in particular the fiber materials mentioned, by the application techniques known for water-soluble dyestuffs, in particular for fiber-reactive dyestuffs, and they are fixed on these materials in particular by the action of an alkaline reacting agent or by the action of heat or by both measures. The materials are preferably used in the form of fiber materials, in particular in the form of textile fibers, such as woven fabrics or yarns, such as in the form of hanks or wound packages.

Materials containing hydroxy groups are those of naturally occurring or synthetic origin, such as, for example, cellulose fiber materials or regenerated products thereof, and polyvinyl alcohols. Cellulose fiber materials are preferably cotton, but also other plant fibers, such as linen, hemp, jute and ramie fibers; regenerated cellulose fibers are, for example, viscose staple and filament viscose.

Materials containing carboxamide groups are, for example, synthetic and naturally occurring polyamides and polyurethanes, in particular in the form of fibers, for example wool and other animal hair, silk, leather, nylon 6,6, nylon 6, nylon 11, and nylon 4.

Dyeings with very good color yields which are improved with respect to the individual dyestuffs are those obtained with them on cellulose fibers by the exhaustion process for a long liquor ratio using the most diverse acid-binding agents and if appropriate neutral salts, such as sodium chloride or sodium sulfate. Dyeing is preferably carried out in an aqueous bath at temperatures between 40 and 105° C., if appropriate at a temperature of up to 130° C. under pressure, and if appropriate in the presence of customary dyeing auxiliaries. A procedure can be followed here in which the material is introduced into the hot bath, this is gradually heated to the desired dyeing temperature and the dyeing process is brought to completion at this temperature. If desired, the neutral salts which accelerate exhaustion of the dyestuffs can also be added to the bath only after the actual dyeing temperature has been reached.

Very good color yields and a very good color build-up are likewise obtained by the padding process on cellulose fibers, it being possible for the dyeings to be fixed in the customary manner by batching at room temperature or elevated temperature, for example up to about 60° C., by steaming or with dry heat.

Strong prints with a good contour level and a clear white background are likewise obtained by the customary printing processes for cellulose fibers, which can be carried out in one phase, for example by printing with a printing paste comprising sodium bicarbonate or another acid binding agent and subsequent steaming at 100 to 103° C., or in two phases, for example by printing with neutral or weakly acid printing ink and subsequent fixing either by passing the goods through a hot electrolyte-containing alkaline bath or by over-padding with an alkaline electrolyte-containing padding liquor and subsequent batching or steaming or dry heat treatment of the material over-padded under alkaline conditions. The printing result depends only little on the varying fixing conditions.

Hot air at 120 to 200° C. is used for fixing by means of dry heat by the customary thermofixing processes. In addition to customary steam at 101 to 103° C., it is also possible to employ superheated steam and pressurized steam at temperatures of up to 160° C.

The acid-binding agents and the agents which effect fixing of the dyestuffs of the dye mixtures according to the invention to the cellulose fibers are, for example, water-soluble basic salts of the alkali metals and likewise alkaline earth metals with inorganic or organic acids, or compounds which liberate alkali under the influence of heat. The alkali metal hydroxides and alkali metal salts of weak to moderately strong inorganic or organic acids are to be mentioned in particular, the alkali metal compounds preferably meaning sodium and potassium compounds. Such acid-binding agents are, for example, sodium hydroxide, potassium hydroxide, sodium carbonate, sodium bicarbonate, potassium carbonate, sodium formate, sodium dihydrogen phosphate, disodium hydrogen phosphate, sodium trichloroacetate, water-glass or trisodium phosphate.

The dye mixtures according to the invention are distinguished by a high fixing yield when used in dyeing and printing processes on cellulose fiber materials. After customary after-treatment by rinsing to remove non-fixed portions of dyestuff, the dyeings on cellulose show excellent wet-fastnesses, especially since non-fixed portions of dyestuff can easily be washed out because of their good solubility in cold water. The dyeings and prints obtained have clear shades; in particular, the dyeings and prints on cellulose fiber materials have a good lightfastness and very good wet-fastnesses, such as fastness to washing, milling, water, seawater, cross-dyeing and acid and alkaline perspiration, and furthermore a good fastness to pleating, fastness to ironing and fastness to rubbing.

The dye mixtures according to the invention can furthermore also be used for fiber-reactive dyeing of wool. Wool which has been given an antifelting or low-felting treatment (cf., for example, H. Rath, Lehrbuch der Textilchemie (Textbook of Textile Chemistry), Springer-Verlag, 3rd edition (1972), pages 295–299, in particular treatment by the so-called Hercosett process (page 298), J. Soc. Dyers and Colourists 1972, 93–99, and 1975, 33–44) can also be dyed with very good fastness properties.

The process for dyeing wool is carried out here by the customary and known dyeing procedure from an acid medium. Thus, for example, acetic acid and/or ammonium sulfate or acetic acid and ammonium acetate or sodium acetate can be added to the dyebath in order to obtain the desired pH. To achieve a usable levelness of the dyeing, it is advisable to add customary leveling auxiliaries, such as, for example, those based on a reaction product of cyanuric chloride with 3 times the molar amount of an aminobenzensulfonic acid, or based on a reaction product of, for example, stearylamine with ethylene oxide. Thus, for example, the dye mixture according to the invention is preferably first subjected to the exhaustion process from and acid dyebath with a pH of about 3.5 to 5.5, the pH being controlled, and, towards the end of the dyeing time, the pH is shifted into the neutral and, if appropriate, weakly alkaline range up to a pH of 8.5, in order to bring about a complete reactive bond between the dyestuffs of the dye mixtures and the fiber in particular to achieve good depths of color. At the same time, the dyestuff portion which has not been bonded reactively is dissolved off.

The procedure described here also applies to the production of dyeings on fiber materials of other naturally occurring polyamides or of synthetic polyamides and polyurethane. As a rule, the material to be dyed is introduced into the bath at a temperature of about 40° C. and agitated therein for some time, the dyebath is then adjusted to the desired weakly acidic pH, preferably with acetic acid, and the actual dyeing carried out at a temperature between 60 and 98° C. The dyeings can also be carried out at the boiling point or in closed dyeing apparati at temperatures of up to 106° C. Since the water-solubility of the dye mixtures according to the invention is very good, they can also advantageously be employed in customary continuous dyeing processes.

The dye mixtures according to the invention afford clear yellowish-tinged to reddish-tinged orange dyeings on the materials mentioned, preferably fiber materials.

The following Examples serve to illustrate the invention. The parts are parts by weight and the percentage data are percentages by weight, unless stated otherwise. Parts by weight bear the same relation to parts by volume as the kilogram to the liter. The compounds described by their formulae in the Examples are shown in the form of free acids; they are in general prepared and isolated in the form of their salts, in particular alkali metal salts, preferably sodium or potassium salts, and used for dyeing in the form of their salts.

EXAMPLE 1

A dye mixture according to the invention is obtained by mixing in a mechanical mixer 150 parts of a yellow electrolyte-salt containing dyestuff of formula (A), prepared similarly to the method described in the German Patent DE-C 1215282 in a proportion of 50% with 50 parts of a golden-yellow electrolyte-salt containing dyestuff of formula (B), prepared analogously to the method described in the German Patent DE-C 1911427, in a proportion of 50%. The resulting dye mixture of the invention, when employed by application and fixing methods customary in the art of fiber-reactive dyes, produces on cellulose fiber materials, for example dyeings and prints deep, neutral yellow shades.

ods customary in the art of fiber-reactive dyes, produces on cellulose fiber materials, for example dyeings and prints deep, neutral yellow shades.

EXAMPLE 4

A dye mixture according to the invention is obtained by mixing in a mechanical mixer 133 parts of a yellow electrolyte-salt containing dyestuff of formula (A), in a proportion of 50% with 67 parts of a golden-yellow electrolyte-salt containing dyestuff of formula (B), in a

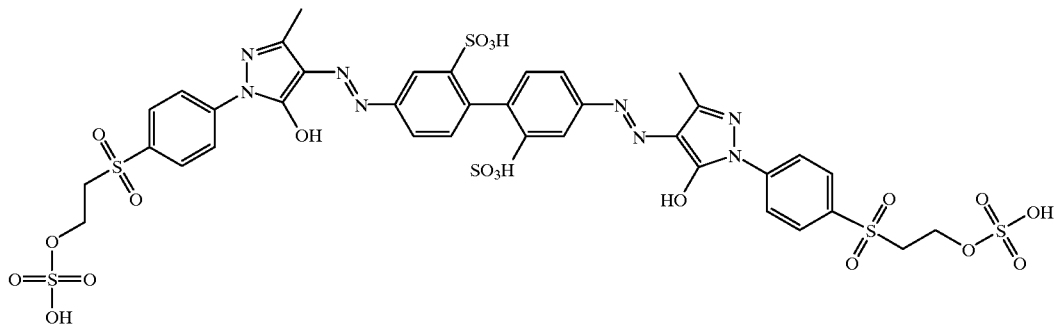

(Formula A)

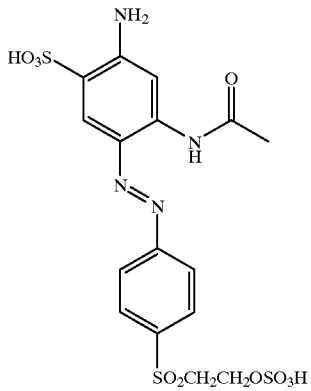

(Formula B)

EXAMPLE 2

A dye mixture according to the invention is obtained by mixing in a mechanical mixer 150 parts of a yellow electrolyte-salt containing dyestuff of formula (A), in a proportion of 50% with 150 parts of a golden-yellow electrolyte-salt containing dyestuff of formula (B), in a proportion of 50%. The resulting dye mixture of the invention, when employed by application and fixing methods customary in the art of fiber-reactive dyes, produces on cellulose fiber materials, for example dyeings and prints deep, neutral yellow shades.

EXAMPLE 3

A dye mixture according to the invention is obtained by mixing in a mechanical mixer 50 parts of a yellow electrolyte-salt containing dyestuff of formula (A), in a proportion of 50% with 150 parts of a golden-yellow electrolyte-salt containing dyestuff of formula (B), in a proportion of 50%. The resulting dye mixture of the invention, when employed by application and fixing methproportion of 50%. The resulting dye mixture of the invention, when employed by application and fixing methods customary in the art of fiber-reactive dyes, produces on cellulose fiber materials, for example dyeings and prints deep, neutral yellow shades.

The following Tabular examples serve to illustrate the invention. They can be prepared in the manner according to the invention by mechanical mixing of the individual dyestuffs. The numerical ratios stated in the column WR indicate the weight ratio in percent of the dyestuff of the formula (A) to the dyestuff or dyestuffs of the formula (C) in the particular dye mixture. The compounds described by their formulae in the Examples are shown in the form of free acids; they are in general prepared and isolated in the form of their salts, in particular alkali metal salts, preferably sodium or potassium salts, and used for dyeing in the form of their salts.

$$D-N=N-K$$

Formula (C)

| Ex. | Dye of Formula (C) | WR (A:C) |
|---|---|---|
| 5 | Structure: 4-methoxy-5-methyl-2-sulfo-phenyl-NH-CO-CH(N=N-Ar)-CO-CH₃, where Ar = 2-methoxy-5-methyl-4-(SO₂CH₂CH₂OSO₃H)phenyl | 75:25 |
| 6 | Ditto Ex. 1 | 50:50 |
| 7 | Structure: 4-methoxy-5-methyl-2-sulfo-phenyl-NH-CO-CH(N=N-Ar')-CO-CH₃, where Ar' = 2,5-dimethoxy-4-(SO₂CH₂CH₂OSO₃H)phenyl | 60:40 |
| 8 | Ditto Ex. 3 | 25:75 |
| 9 | Structure: 5-amino-4-sulfo-2-[(4-(SO₂CH₂CH₂OSO₃H)phenyl)azo]-phenyl with NH-CO-NH₂ (ureido) substituent | 50:50 |

-continued

D-N = N-K
Formula (C)

| Ex. | Dye of Formula (C) | WR (A:C) |
|---|---|---|
| 10 | 5-amino-4-sulfo-2-[(4-(2-sulfatoethylsulfonyl)phenyl)azo]phenyl 2-carboxybenzamide | 70:30 |
| 11 | 5-amino-4-sulfo-2-[(4-(2-sulfatoethylsulfonyl)phenyl)azo]phenyl 2-sulfobenzamide | 50:50 |
| 12 | 1-amino-2-[(4-(2-sulfatoethylsulfonyl)phenyl)azo]-4-sulfonaphthalene | 35:65 |
| 13 | 1-[(4-(2-sulfatoethylsulfonyl)phenyl)azo]-2-amino-6-sulfonaphthalene | 30:70 |

-continued

D-N = N-K

Formula (C)

| Ex. | Dye of Formula (C) | WR (A:C) |
|---|---|---|
| 14 | [Structure: 2-hydroxy-6-sulfo-naphthalene coupled via azo to phenyl-SO₂CH₂CH₂OSO₃H] | 50:50 |
| 15 | [Structure: 1-hydroxy-4-sulfo-naphthalene coupled via azo to phenyl-SO₂CH₂CH₂OSO₃H] | 70:30 |
| 16 | [Structure: 2-amino-5-sulfo-naphthalene coupled via azo to phenyl-SO₂CH₂CH₂OSO₃H] | 35:65 |
| 17 | [Structure: HO₃OSOCH₂CH₂O₂S-naphthalene-SO₃H coupled via azo to OH/NHAc/SO₃H-naphthalene-SO₃H] | 50:50 |

-continued

D-N=N-K

Formula (C)

| Ex. | Dye of Formula (C) | WR (A:C) |
|---|---|---|
| 18 | Dye structure: 6-(2-sulfatoethylsulfonyl)-1-sulfonaphthalen-2-yl azo coupled to 1-hydroxy-4-benzoylamino-6-sulfo-8-sulfo-naphthalene | 50:50 |
| 19 | Dye structure: 6-(2-sulfatoethylsulfonyl)-8-sulfonaphthalen-2-yl azo coupled to 1-hydroxy-4-benzoylamino-6-sulfo-8-sulfo-naphthalene (positional isomer) | 70:30 |
| 20 | Dye structure: 4-(2-sulfatoethylsulfonyl)phenyl azo coupled to 1-hydroxy-4-benzoylamino-6-sulfo-8-sulfo-naphthalene | 40:60 |
| 21 | Dye structure: 4-(2-sulfatoethylsulfonyl)-2-sulfophenyl azo coupled to 1-hydroxy-4-benzoylamino-6-sulfo-8-sulfo-naphthalene | 40:60 |
| 22 | Dye structure: 5-(2-sulfatoethylsulfonyl)-2-sulfophenyl azo coupled to 1-hydroxy-4-benzoylamino-6-sulfo-8-sulfo-naphthalene | 40:60 |

-continued

D-N = N-K
Formula (C)

| Ex. | Dye of Formula (C) | WR (A:C) |
|---|---|---|
| 23 | HO₃SOCH₂CH₂O₂S–C₆H₄–N=N–[1-hydroxy-3-sulfo-6-acetamido-naphthalen-2-yl] | 50:50 |
| 24 | HO₃SOCH₂CH₂O₂S–C₆H₄–N=N–[1-hydroxy-3-sulfo-6-acetamido-naphthalen-2-yl] (isomer) | 50:50 |
| 25 | HO₃SOCH₂CHO₂S–[6-(1-sulfo)naphthyl]–N=N–[1-hydroxy-3-sulfo-6-acetamido-naphthalen-2-yl] | 30:70 |
| 26 | HO₃SOCH₂CHO₂S–[6-(8-sulfo)naphthyl]–N=N–[1-hydroxy-3-sulfo-6-acetamido-naphthalen-2-yl] | 35:65 |
| 27 | HO₃SOCH₂CHO₂S–[6-(1-sulfo)naphthyl]–N=N–[1-hydroxy-3-sulfo-6-(succinamido)-naphthalen-2-yl] | 40:60 |
| 28 | HO₃SOCH₂CH₂O₂S–C₆H₄–N=N–[1-hydroxy-3-sulfo-6-(2-carboxybenzamido)-naphthalen-2-yl] | 60:40 |

-continued

D-N = N-K

Formula (C)

| Ex. | Dye of Formula (C) | WR (A:C) |
|---|---|---|
| 29 | | 75:25 |
| 30 | | 35:65 |
| 31 | | 35:65 |
| 32 | | 25:75 |

-continued
$$D-N=N-K$$
Formula (C)
| Ex. | Dye of Formula (C) | WR (A:C) |
|---|---|---|
| 33 | 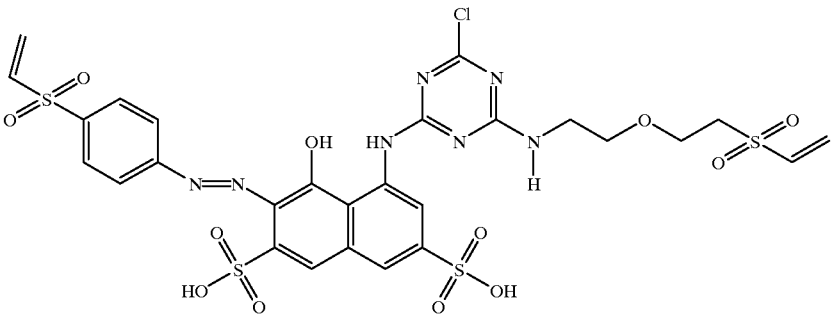 | 34:66 |
| 34 | 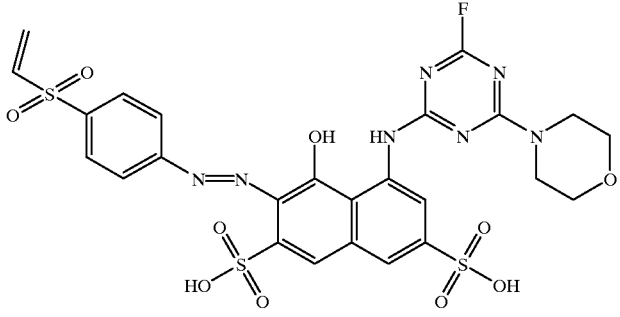 | 70:30 |
| 35 | 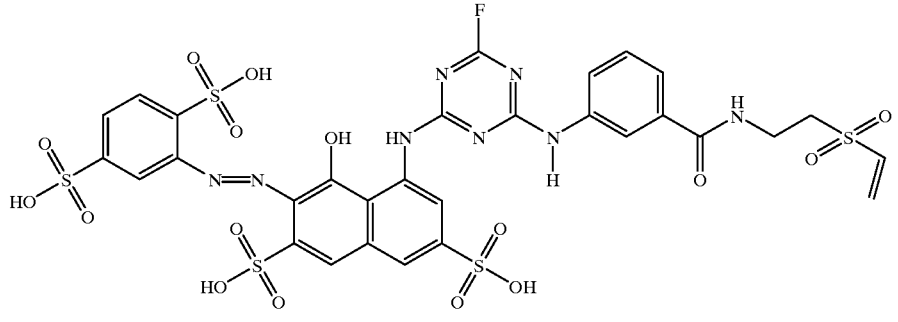 | 40:60 |
| 36 | 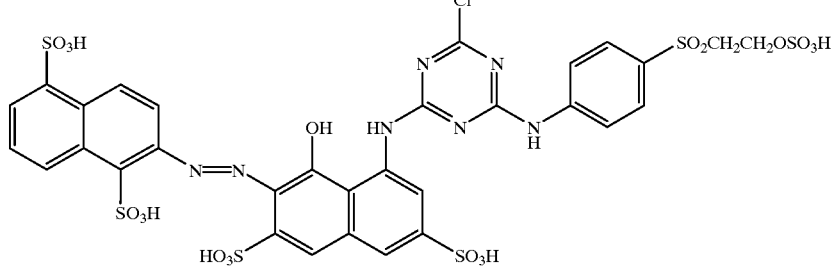 | 50:50 |

-continued
D-N = N-K
Formula (C)
| Ex. | Dye of Formula (C) | WR (A:C) |
|---|---|---|
| 37 | 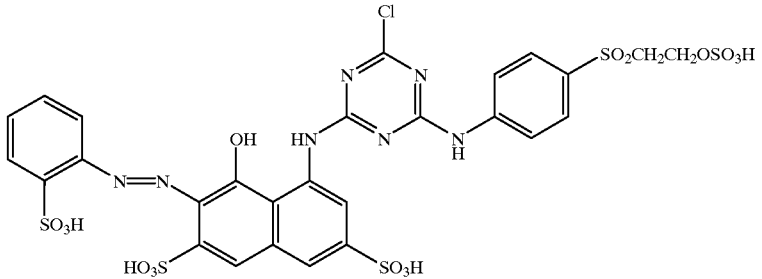 | 60:40 |
| 38 | 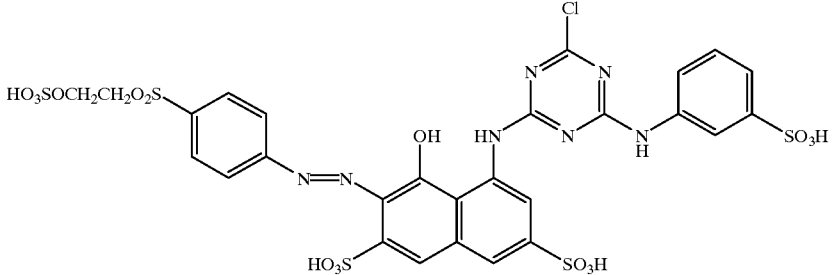 | 30:70 |
| 39 | 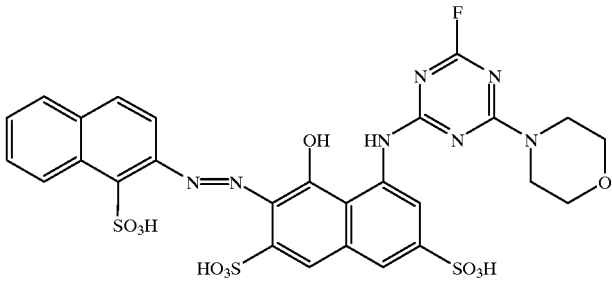 | 60:40 |
| 40 | 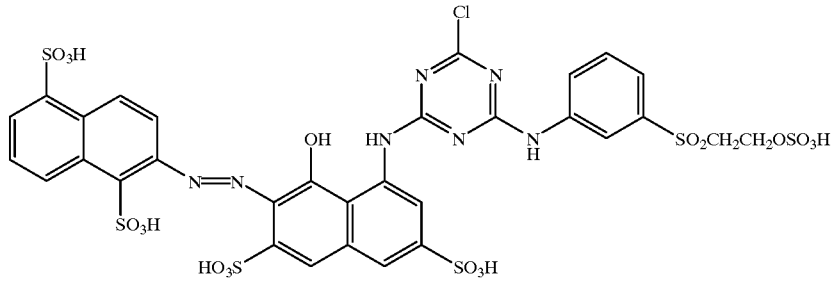 | 30:70 |
| 41 | 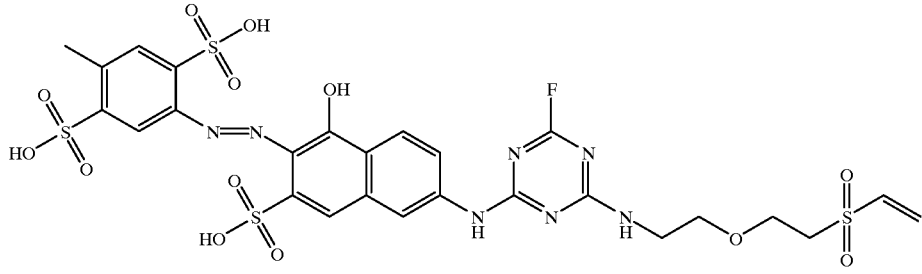 | 45:55 |

-continued

D-N = N-K
Formula (C)

| Ex. | Dye of Formula (C) | WR (A:C) |
|---|---|---|
| 42 | | 50:50 |
| 43 | | 60:40 |
| 44 | | 35:65 |
| 45 | | 25:75 |
| 46 | | 20:80 |

-continued

D-N = N-K

Formula (C)

| Ex. | Dye of Formula (C) | WR (A:C) |
|---|---|---|
| 47 | | 30:70 |
| 48 | | 25:75 |
| 49 | | 20:80 |
| 50 | | 20:80 |
| 51 | | 25:75 |

-continued
D-N = N-K
Formula (C)
| Ex. | Dye of Formula (C) | WR (A:C) |
|---|---|---|
| 52 | | 33.5:66.5 |
| 53 | | 30:70 |
What is claimed is:
1. A dye mixture comprising one or more monoazo dyestuffs corresponding to the general formula (1) and one or more dyestuffs corresponding to the general formula (2a), (2b) or (2c)
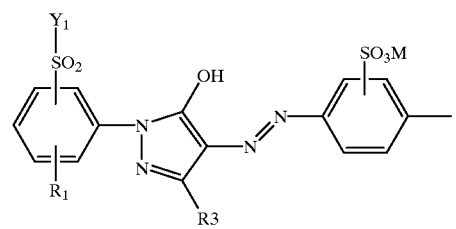
(1)
-continued
[B—N═N—K] (2)
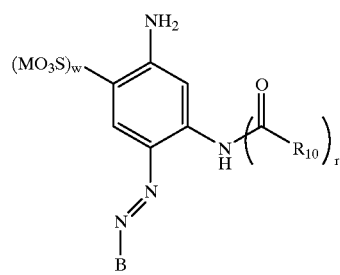
(2a)
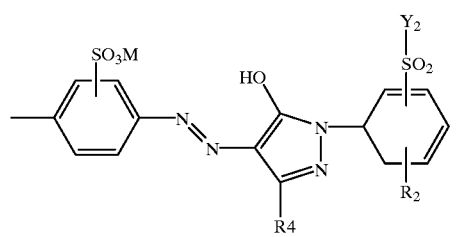
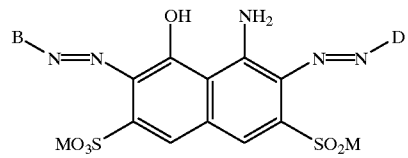
(2b)

-continued

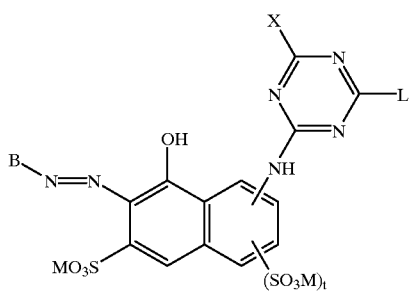
(2c)

in which
R$_1$ is hydrogen, sulfo, C$_1$–C$_4$ alkyl, alkoxy or halogen;
R$_2$ has one of the meanings of R$_1$;
R$_3$ is C$_1$–C$_4$-alkyl, phenyl, carboxy or C$_1$C$_4$-carboxyalkyl;
R$_4$ has one of the meanings of R$_3$;
Y$_1$ is vinyl or is ethyl which is substituted in the β-position by a substituent which is eliminated by the action of an alkali, forming the vinyl group;
Y$_2$ has one of the meanings of Y$_1$,
B is a radical of the formulae (3) or (4) or (5);
M is hydrogen or an alkali metal;

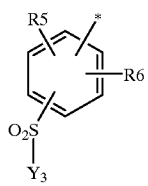
(3)

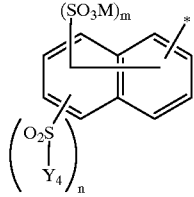
(4)

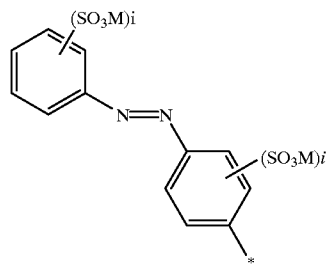
(5)

in which,
R$_5$ has one of the meanings of R$_1$:
R$_6$ has one of the meanings of R$_1$;
Y$_3$ has one of the meanings of Y$_1$:
Y$_4$ has one of the meanings of Y$_1$;
m is a number 0, 1, or 2;
is a number 0 or 1;
n is a number 0 or 1; a structure of the formula (3);
M is hydrogen or an alkali metal;

R$_{10}$ is amino, substituted or unsubstituted C$_{1–C4}$ alkyl, substituted or unsubstituted phenyl;
D is the radical (3), (4), or (5);
G is amino or hydroxy;
X is hydroxy, chloro, fluoro, morpholino, nicotinamido, 3-carboxypyridino, or a radical of the formulae L;
r, t, w are identical or different and are the number 0 or 1;
L has one of the meanings of formulae (12), (13) or (14);
M is hydrogen or an alkali metal;

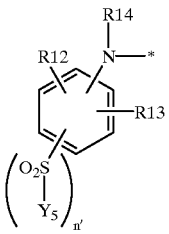
(12)

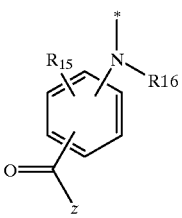
(13)

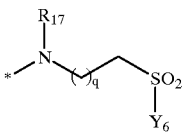
(14)

in which
R$_{12}$ is hydrogen, C$_{1–C4}$ alkyl, C$_1$–C$_{14}$ alkoxy, halogen or sulfo;
R$_{13}$ is hydrogen, C$_{1–C4}$ alkyl, alkoxy, halogen or sulfo;
R$_{14}$ is hydrogen, C$_1$–C$_6$ alkyl, or substituted or unsubstituted phenyl:
R$_{15}$ is hydrogen or sulfo;
R$_{16}$ is hydrogen, C$_1$–C$_6$ alkyl, or substituted or unsubstituted phenyl;
R$_{17}$ is hydrogen, C$_1$–C$_6$ alkyl, or substituted or unsubstituted phenyl;
Y$_5$ has one of the meanings of Y$_1$
Y$_6$ has one of the meanings of Y$_1$;
n' is the number 0 or 1;
q represents C$_1$–C$_5$-alkylene groups, which is optionally interrupted by a nitrogen, oxygen, or a sulfur atom; and
Z is a radical of the formulae (12) or (14).

2. A dyestuff mixture as claimed in claim 1, comprising one or more azo dyestuffs corresponding to the formula (1) and one or more azo dyestuffs corresponding to the formula (2a), (2b) or (2c) in a mixing ratio of 80:20% by weight to 20:80% by weight.

3. A dye mixture as claimed in claim 1, comprising one or more azo dyestuffs corresponding to the formula (1) and one or more azo dyestuffs corresponding to the formula (2) in a mixing ratio of 70:30% by weight to 30:70% by weight.

4. A dye mixture as claimed in claim 1, wherein R$_1$ and R$_2$ are hydrogen and R$_3$ and R$_4$ are methyl.

5. A dye mixture according to claim 1, wherein $Y_1$ is in each instance, independently of the others, vinyl or is ethyl substituted in the β-position by chlorine, thiosulfato, sulfato, alkanoyloxy of 2 to 5 carbon atoms, phosphate, sulfobenzoyloxy or p-toluylsulfonyloxy.

6. A dye mixture according to claim 1, wherein $Y_1$ is in each instance, independently of the others, vinyl or β-sulfatoethyl.

7. A process for dyeing hydroxy- and/or carboxamido-containing material, which comprises applying the dye mixture as claimed in claim 1 to the material and the dyes are fixed to the material by (a) means of heat,
(b) with the aid of an alkali or
(c) by means of heat and with the aid of an alkali.

8. A dye mixture according to claim 1, wherein the dye of the general formula 2 is a dye of the formula 2A or 2B or 2C

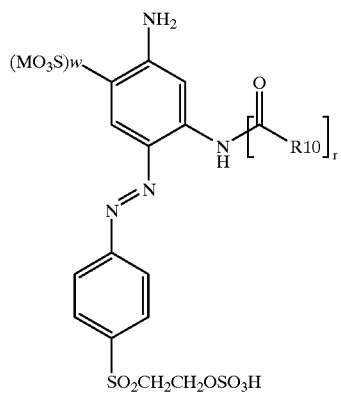

(2A)

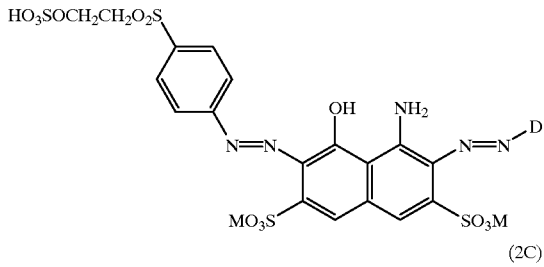

(2B)

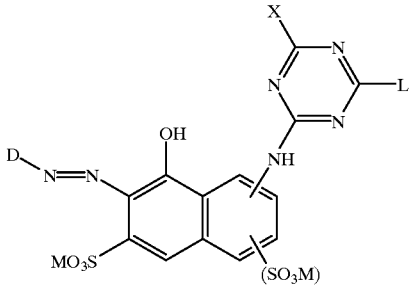

(2C)

in which $R_{10}$, D, X, L, r, t, w and M are defined as given in claim 1.

9. A method for preparing the dye mixture of claim 1 comprising mechanically mixing the individual dyes.

* * * * *

UNITED STATES PATENT AND TRADEMARK OFFICE
CERTIFICATE OF CORRECTION

PATENT NO. : 6,190,423 B1
DATED : February 20, 2001
INVENTOR(S) : Christian Schumacher et al It is certified that error appears in the above-identified patent and that said Letters Patent is hereby corrected as shown below:

Claim 1, Column 35:
Line 41, (Claim 1, line 3) before "dyestuffs" insert --azo--.

Claim 1, Column 37:
Line 65, before "is a number 0 or 1" insert --i--.

Claim 1, Column 37:
Line 66, please delete the phrase "a structure of the formula (3)".

Claim 1, Column 38:
Line 40, change "$C_1$-$c_4$" to read --$C_1$-$C_4$--

Claim 1, Column 38:
Line 40, change "$C_1$-$C_{14}$" to read --$C_1$-$C_4$--;

Claim 1, Column 38:
Line 42, change "$C_1$-$c_4$" to read --$C_1$-$C_4$--;

Claim 3, Column 38:
Line 64, "formula (2)" should read --formula (2a), (2b) or (2c)--.

Signed and Sealed this

Twelfth Day of June, 2001

Attest:

NICHOLAS P. GODICI
Attesting Officer
Acting Director of the United States Patent and Trademark Office